Aug. 15, 1933.　　　A. H. WOBBE　　　1,922,833
CLUTCH
Filed July 30, 1932　　2 Sheets-Sheet 1
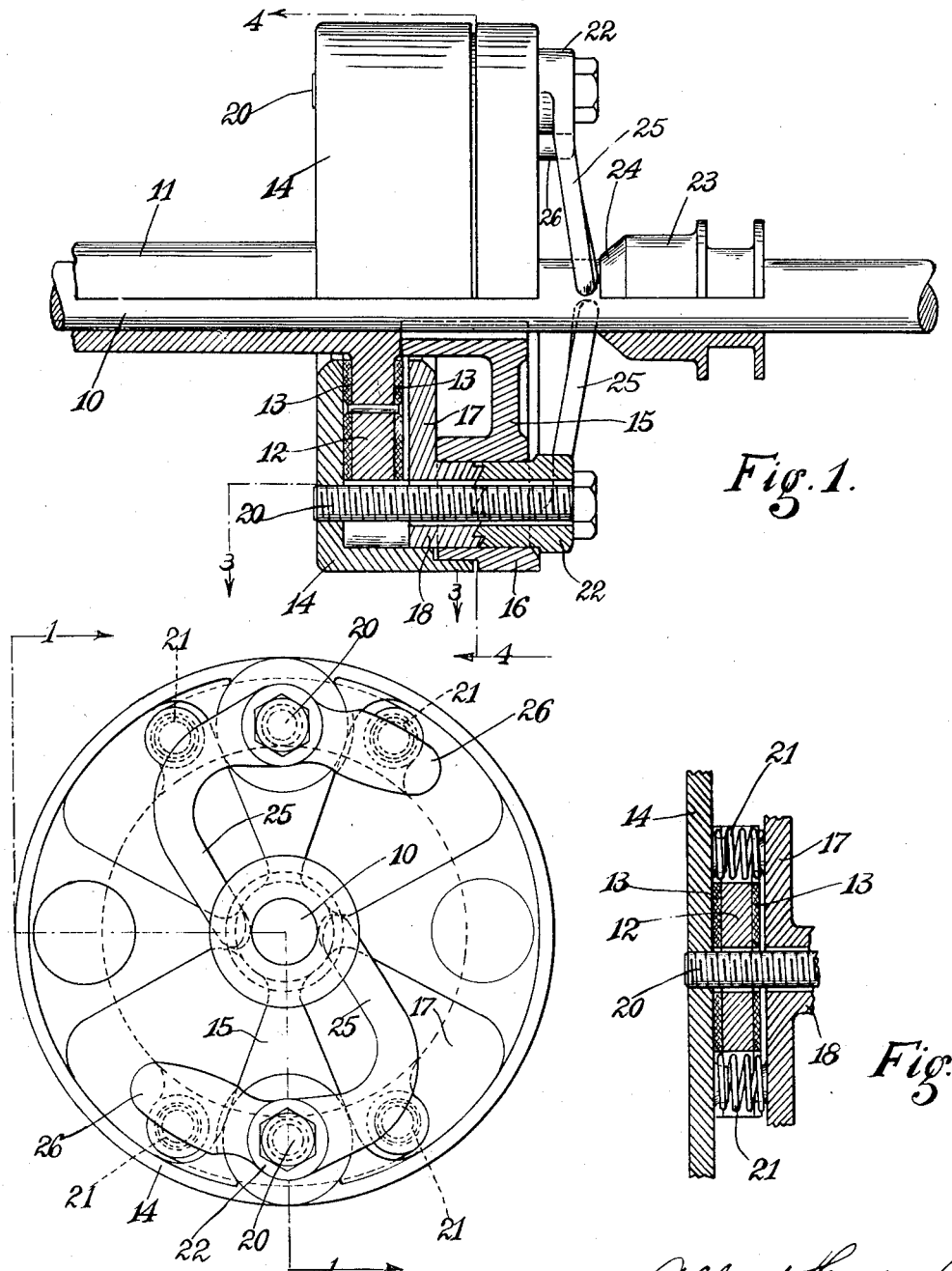

Aug. 15, 1933.  A. H. WOBBE  1,922,833
CLUTCH
Filed July 30, 1932   2 Sheets-Sheet 2

INVENTOR:
Alfred Herman Wobbe
BY Erich H. Michaelis
ATTORNEY.

Patented Aug. 15, 1933

1,922,833

UNITED STATES PATENT OFFICE 1,922,833

CLUTCH

Alfred Herman Wobbe, Chicago, Ill.

Application July 30, 1932. Serial No. 627,173

2 Claims. (Cl. 192—68)

The invention relates to clutches especially to that type of clutches known as friction clutches.

The object of the invention is to provide a friction clutch in which the friction parts will be kept in position by means of centrifugal power after they are arranged in said position.

Other objects of the invention not specifically mentioned may be easily ascertained and understood from the following description in connection with the accompanying drawings forming a part thereof. It is however to be understood, that the invention is not to be limited or restricted to the exact formation and construction shown in the drawings, and described in the specification, but that said invention is only to be limited by the scope of the claims appended hereto.

In the drawings illustrating a preferred embodiment of the invention.

Fig. 1 is a view partially in section taken on line 1—1 in Fig. 2.

Fig. 2 is an end view of Fig. 1.

Fig. 3 is a sectional view taken on line 3—3 in Fig. 1.

Figure 4:
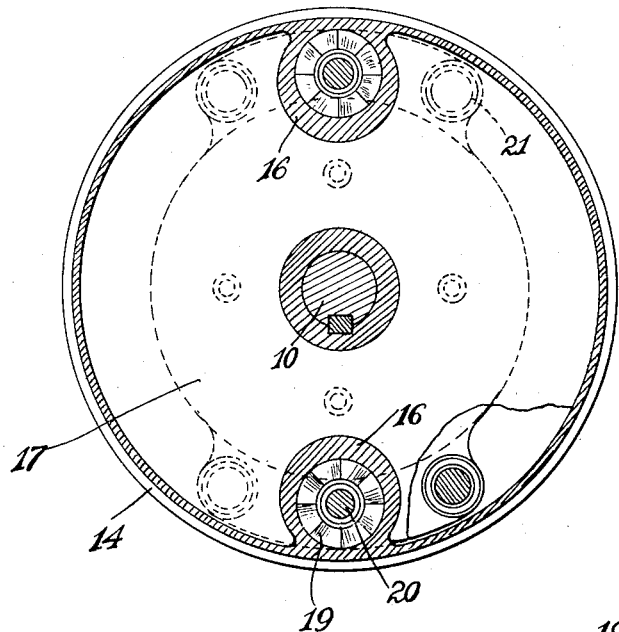
Fig. 4 is a sectional view taken on line 4—4 in Fig. 1.
Figures 5, 6:
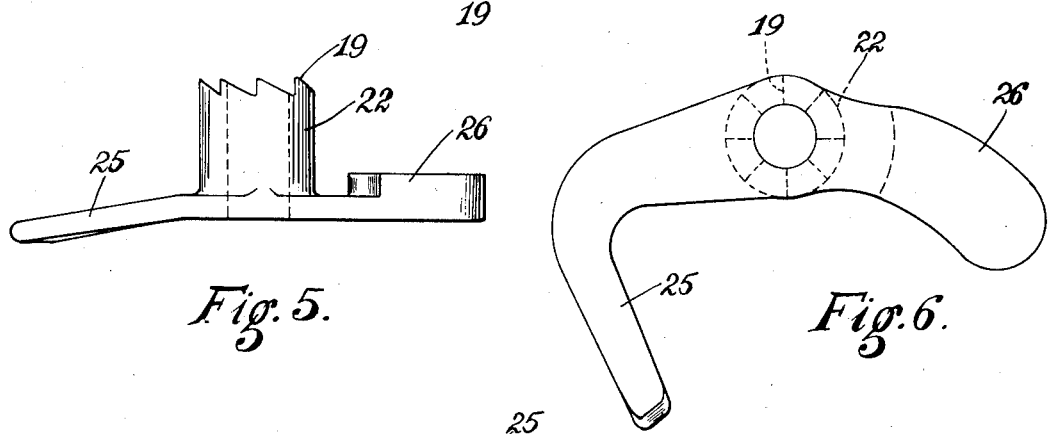
Fig. 5 is a side view of a lever actuating the friction plates of the clutch according to the present invention.
Fig. 6 is a plan view of said actuating lever.

On a shaft 10 a hollow connecting piece 11 is rotatably mounted. This connecting piece is adapted to be rigidly fastened to a second shaft which is not shown. The connecting piece 11 is provided with a friction disc 12 which extends at right angles from the connecting piece and may be formed as an integral part of said connecting member. The axis of said disc and of said connecting member coincide. At both sides of the friction disc 12 friction material 13 may be fastened to said disc. A cap 14 surrounds the friction member 12. A carrier 15 has a sleeve surrounding the shaft 10 adjacent the connecting piece 11 and arranged partly inside the cap 14. This carrier is fastened to the shaft by means of a key or in any other suitable manner. From the sleeve of the carrier 15 a disc like portion extends radially. On the outer rim of this disc a plurality of guiding sleeves 16 are formed. The rim of the cap 14 and the adjacent part of the carrier 15 are provided with cooperating offset portions, as indicated in Figs. 1 and 7, so that said two parts will form a closed housing after the clutch is entirely assembled.

An actuating plate 17 fits slidingly onto the sleeve of the carrier 15, and is on its outer rim provided with a plurality of lugs 18 extending axially of the plate 17. Each of said lugs fits slidingly into the bore of a corresponding guide sleeve 16 and contacts in addition to that a portion of the inner circumference of the cap 14. The outer surface of each lug is provided with a plurality of ratchet teeth 19. Each lug has a central bore registering with a corresponding tapped opening provided in the bottom of the cap 14, permitting a bolt 20 to extend through said bores and into said openings. A plurality of springs 21 are located so that they engage the opposite surfaces of the bottom of the cap 14 and the actuating plate 17. In each bore of the guiding sleeve 16 of the carrier 15 a hollow plug 22 is rotatably arranged which has on its inner surface ratchet teeth corresponding to the ratchet teeth 19. On the shaft 10 a clutch cylinder 23 is slidingly arranged, which may be moved on said shaft in any convenient manner. The portion of the cylinder adjacent the parts described above, is shaped conically as indicated at 24. On each of the hollow plugs 22 a finger or arm 25 is formed extending inwardly, so that it may be engaged by the outer surface of the sliding cylinder 23 when the latter is forced toward the left in Figs. 1 and 7. When the parts are arranged as shown in Fig. 1, the springs 21 urge the actuating plate 17 towards the right in said drawings, that means away from the friction disc, so that the connecting member 11 may turn freely and independently of the shaft 10 and vice versa. When however the sliding clutch cylinder is forced toward the left in Fig. 1 into the position shown in Fig. 7, the conical portion of said cylinder will engage the fingers 25 and will rotate thereby the plugs 22 about their axes. It should be mentioned here, that each plug 22 is held in position by one of the bolts 20, and it should be further mentioned, that the bores in the plugs 22 and the lugs 18 are somewhat bigger than the outside diameter of the bolt 20 which is screwed into the tapped hole in the bottom of cap 14. When the plugs 22 are rotated about their axes, as described above, the movement of the ratchet teeth on said plugs over the inclined surfaces of the ratchet teeth on the lugs 18 will force the lugs away from the plugs. Thereby the actuating plate 17 will be forced against the friction disc 12 and this friction disc 12 will be pressed against the bottom of the cap 14, so that now all those parts will be in frictional contact with each other, thereby connecting the shaft 10 with the connecting piece 11, so that said shaft and said connecting piece will be rotated as one unit when one of said parts should be rotated. In order to increase the pressure between the fingers 25 and the clutch cylinder 23 a counter weight 26 is provided on each plug 22 on the opposite side to the finger 25. When the clutch is in working position, as shown in Fig. 7, and is rotated, the counter weights 26 will be urged outwardly by the centrifugal force, thereby pressing the fingers 25 more firmly against the cylinder 23.

Figure 7:
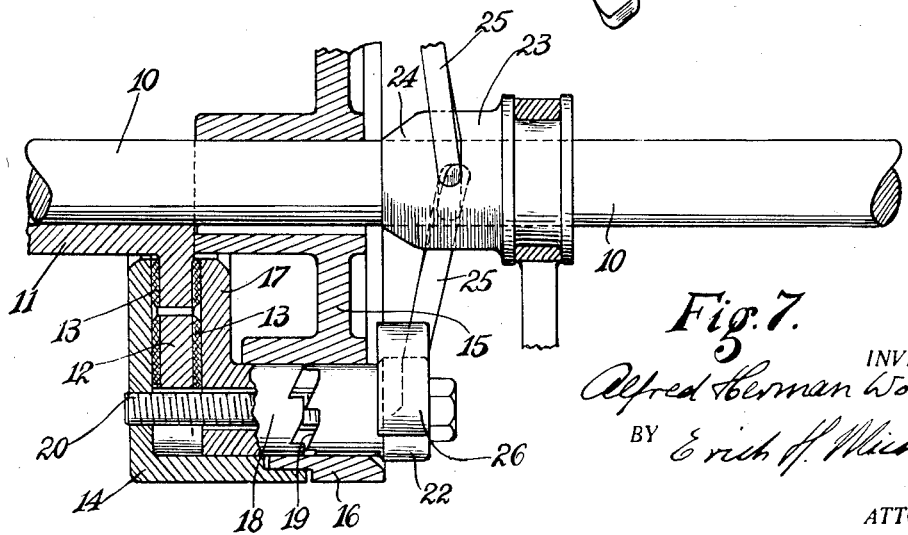
Fig. 7 is an assembly drawing partly shown in section of the clutch according to the present invention in working position.

When the friction members are to be disengaged, the cylinder 23 is moved toward the right of Fig. 7 into the position, shown in Fig. 1. The springs 21 will then urge the actuating plate 17 away from the friction disc 12. Through this movement the ratchet teeth 19 on the lugs of the actuating plate 17 will force the plugs 22 into the position shown in Fig. 1, that means they will rotate said plugs so that the fingers 25 will be positioned to be engaged again by the conical portion of the sliding cylinder.

It is easy to see, that, when the cylinder 23 is moved towards the left in Fig. 1, the friction clutch will connect the member 11 with the shaft 10, and that rotary movement of said parts will then serve to connect said parts more firmly and securely by means of the action on the centrifugal power of the counter weights 26, and that the springs 21 will serve to disengage the shaft and the member 11 as soon as the cylinder 23 is moved towards the right in Fig. 7 into the position shown in Fig. 1.

Having described my invention and how the same is to be performed, I claim as new and desire to secure by Letters Patent:

1. In a clutch of the class described a shaft, a connecting member rotatably mounted on said shaft, a friction clutch disc rigidly connected with said connecting member, a second friction member adjacent the friction disc, an actuating plate arranged adjacent the friction disc and opposite the second friction member, a carrier rigidly mounted on said shaft, a plurality of lugs on the actuating plate, a plurality of guide sleeves on the carrier, each lug slidably fitting in the corresponding guide sleeve, a plug rotatably mounted in each of said guide sleeves, a finger on each plug extending toward the shaft, a cylinder slidably mounted on the shaft and adapted to engage the fingers and thereby to impart rotary movement to the plugs, corresponding inclined planes on the adjacent surfaces of the plugs and the lugs, a plurality of bolts extending through the second friction member, the friction disc, the lug and the plug but permitting sliding movement to the friction disc, and the actuating plate, and a partial rotary movement to the plugs, and a plurality of springs arranged between the second friction member and the actuating plate.

2. In a clutch of the class described a shaft, a connecting member slidingly and rotatably mounted on said shaft, a friction disc rigidly connected with the connecting member, a second friction member arranged adjacent said friction disc, a carrier rigidly mounted on said shaft, a plurality of guiding sleeves on said carrier, an actuating plate adjacent the friction disc opposite the second friction member, a plurality of lugs on the actuating plate and each slidingly fitting into a corresponding guiding sleeve, a plurality of ratchet teeth on the end surface of each lug, a plurality of plugs, each plug being rotatably arranged in one of said guiding sleeves, a plurality of ratchet teeth formed on the surface of each plug opposite the end surface of each lug, each plug being provided with a finger extending toward the shaft and with a counter weight extending approximately at right angles to said finger, a cylinder slidingly mounted on the shaft and adapted to engage the fingers and to impart rotary movement to each plug, and a plurality of springs arranged between the second friction member and the actuating plate urging said plate away from the friction disc and the second friction member.

ALFRED HERMAN WOBBE.